(12) United States Patent
Gatteschi

(10) Patent No.: US 6,892,592 B2
(45) Date of Patent: May 17, 2005

(54) AUTOMATED SYSTEM FOR CHECKING PALLETS

(75) Inventor: Emanuele Gatteschi, Parma (IT)

(73) Assignee: OCME S.r.l., Parma (IT)

( * ) Notice: Subject to any disclaimer, the term of this patent is extended or adjusted under 35 U.S.C. 154(b) by 0 days.

(21) Appl. No.: 10/103,679

(22) Filed: Mar. 21, 2002

(65) Prior Publication Data

US 2002/0166395 A1 Nov. 14, 2002

(30) Foreign Application Priority Data

Mar. 22, 2001 (IT) ..................................... MI2001A0609

(51) Int. Cl.[7] .......................................... G01M 19/00
(52) U.S. Cl. ................................................. 73/865.8
(58) Field of Search .......................... 73/865.8, 788, 73/790; 702/35; 209/602, 605

(56) References Cited

U.S. PATENT DOCUMENTS

| | | | | |
|---|---|---|---|---|
| 4,559,710 A | * | 12/1985 | Koda ......................... | 33/544.6 |
| 4,743,154 A | | 5/1988 | James et al. | |
| 5,203,671 A | * | 4/1993 | Cawley et al. ........... | 414/791.6 |
| 5,297,059 A | * | 3/1994 | Kawasoe .................... | 702/121 |
| 5,630,695 A | | 5/1997 | McDonnell | |
| 6,058,586 A | | 5/2000 | Bowling et al. | |

FOREIGN PATENT DOCUMENTS

| | | | | | |
|---|---|---|---|---|---|
| DE | 3110880 A | * | 12/1982 | .......... | G01M/13/00 |
| DE | 36 30 460 A1 | | 3/1988 | | |
| DE | 199 52 284 A1 | | 5/2001 | | |
| EP | 0 943 394 | | 9/1999 | | |
| GB | 2056681 A | * | 3/1981 | ............ | G01B/5/08 |
| JP | 60150923 A | * | 8/1985 | .......... | B23P/21/00 |
| JP | 09221228 A | * | 8/1997 | .......... | B65G/61/00 |
| WO | 00/78499 A1 | | 6/2000 | | |

OTHER PUBLICATIONS

EPO Search Report.

* cited by examiner

Primary Examiner—Hezron Williams
Assistant Examiner—Nashmiya S. Fayyaz
(74) Attorney, Agent, or Firm—Hedman & Costigan, P.C.

(57) ABSTRACT

An automated system for checking the structural integrity of pallets (22) which, after suitable programming, besides the checking operations and through special pliers (40, 40A) can carry out further handling operations on the pallets (22) between any combination of fixed surfaces (24) and stacks of pallets (26–31), performing the typical functions of traditional stackers (12) and de-stackers (13) and eliminating the needs of bulky transport paths and complex connecting deviations.

1 Claim, 7 Drawing Sheets

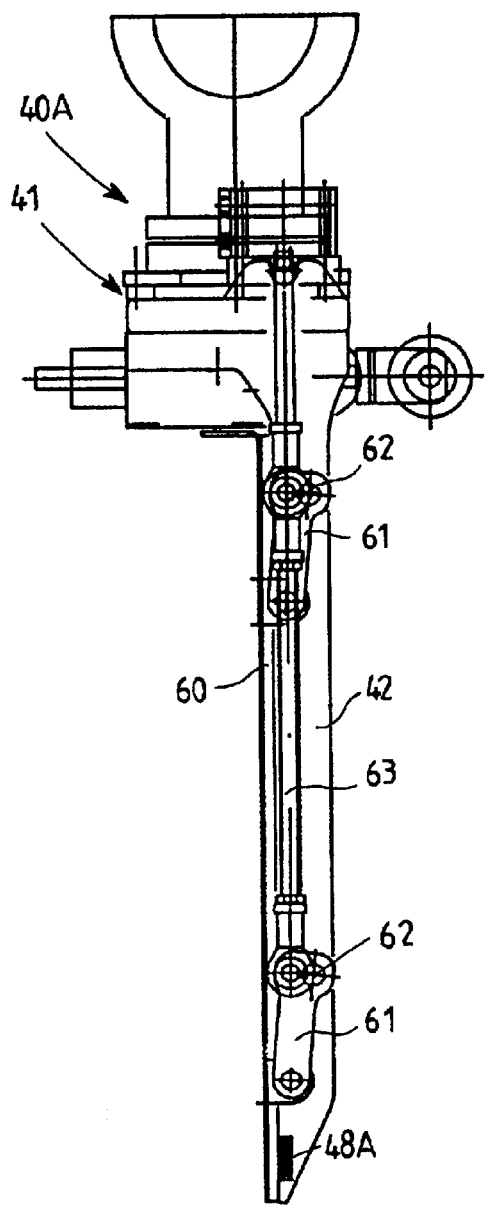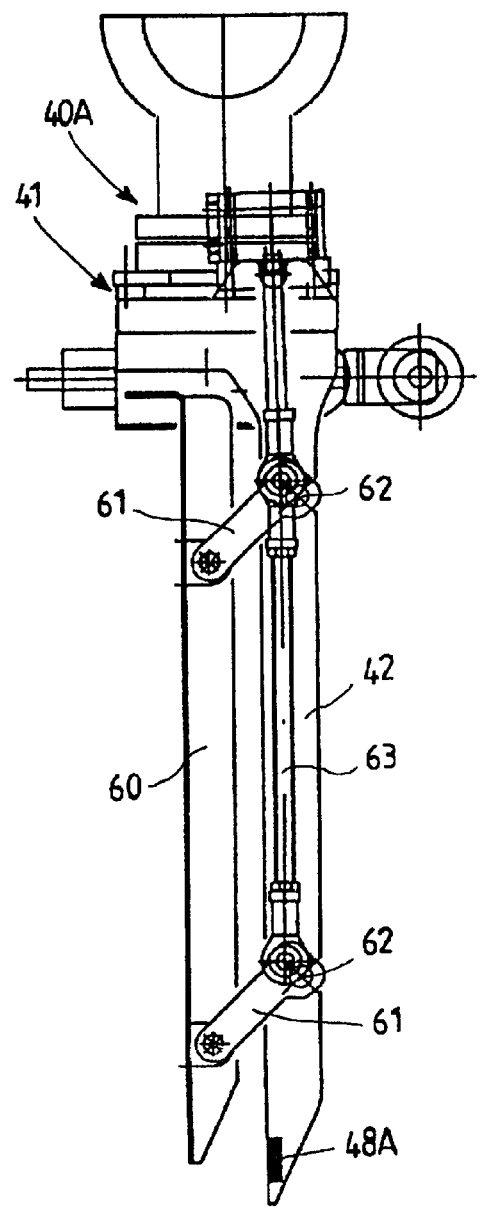

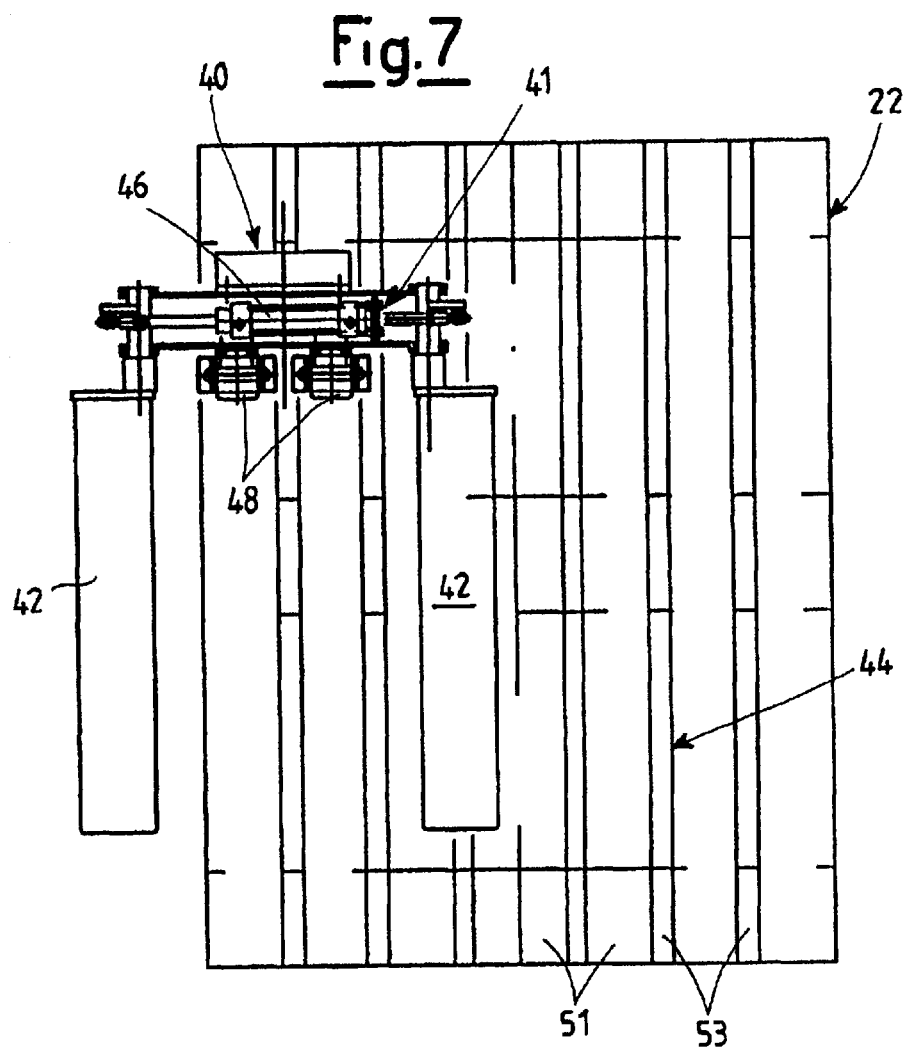
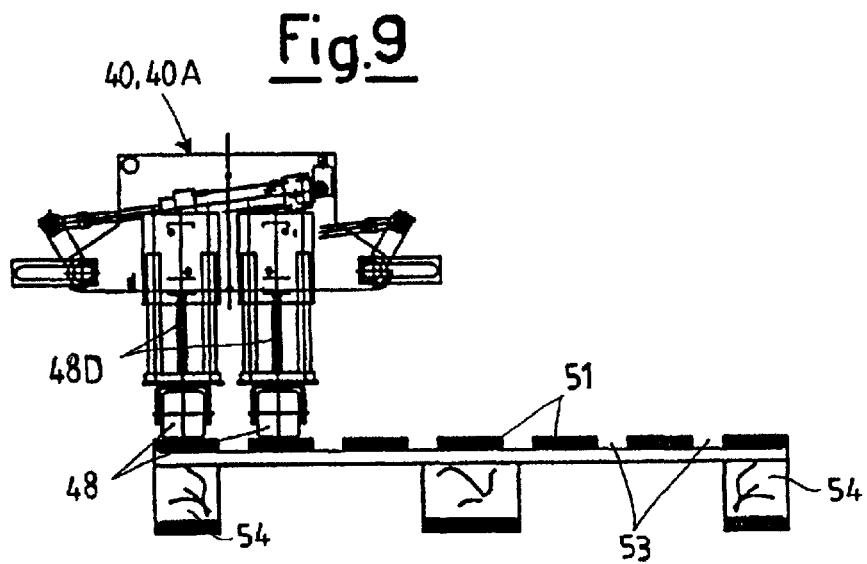

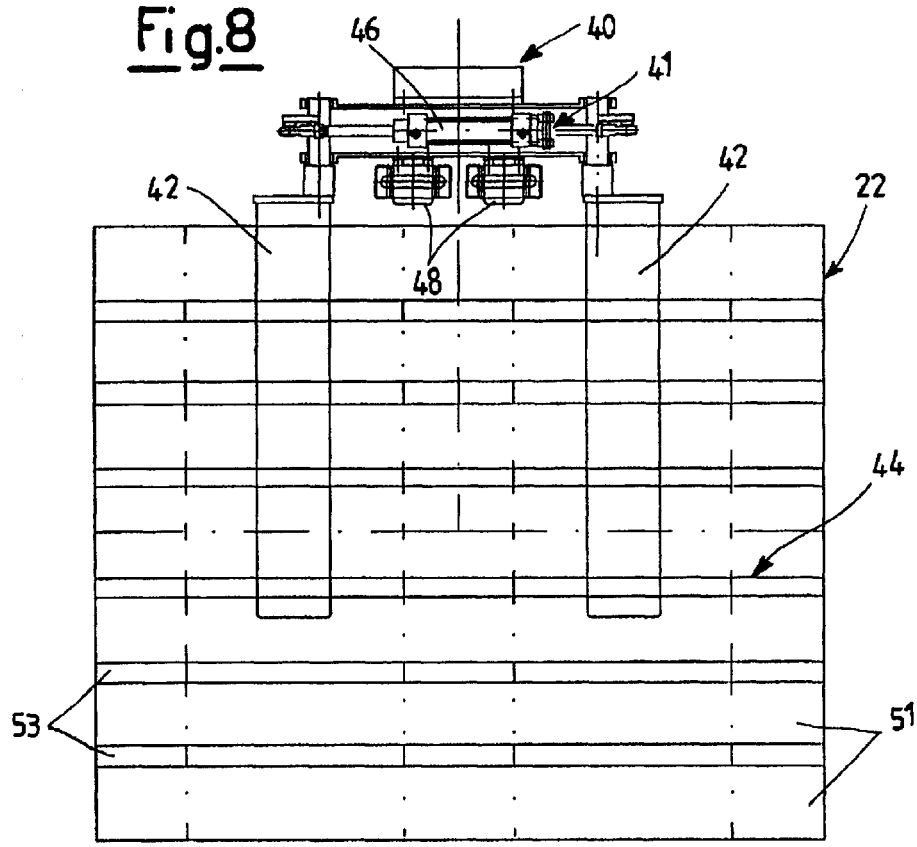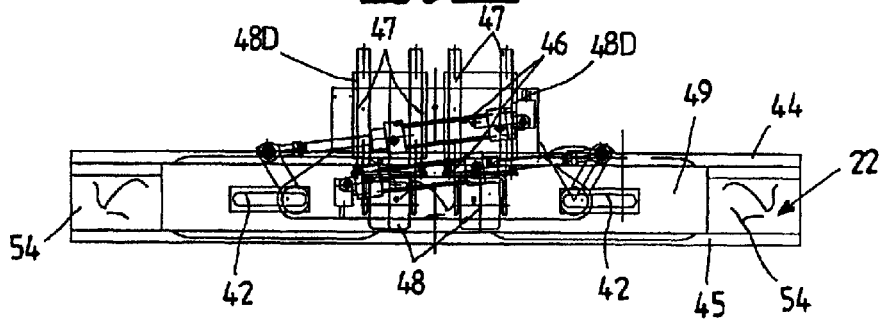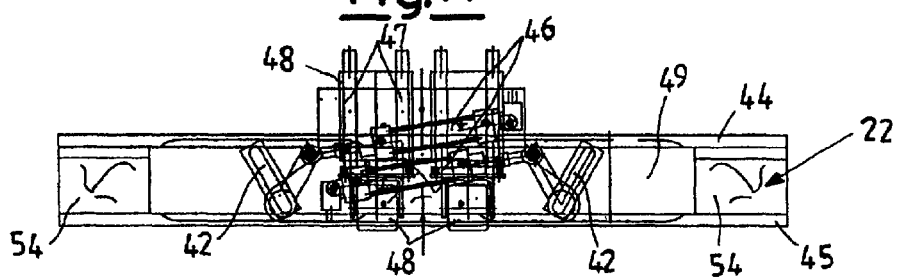

US 6,892,592 B2

AUTOMATED SYSTEM FOR CHECKING PALLETS

The present application claims priority to Italian Patent Application Ser. No. MI 2001A 000679, filed Mar. 22, 2001.

BACKGROUND OF THE INVENTION

The present invention relates to an automatic system for checking the integrity of pallets.

According to the UNI 5042:ISO 445, the term "pallet" denotes a horizontal platform characterised by a minimum height compatible with handling through transpallet carriages and/or fork lift trucks and other suitable handling equipment, used as support for collecting, storing, handling and transporting goods and loads; it can be constructed or provided with an upper structure.

FIG. 1 shows a traditional pallet checking system. It usually comprises an input transport device, indicated with reference numeral 11 in the figure, to which the pallet to be checked arrives in output from a de-palletising device, a stacker 12 and a de-stacker 13, arranged in series, which flicks through the stacks of new replenishing and/or feeding pallets for the palletising device.

Some types of pallets do not need being checked and are thus stacked by stacker 12, with the formed stack removed from the unit.

The system further comprises a pallet tilting device 14, at which the current direction of the tables of the upper surface of the pallet is determined with the aid of a photocell and thereby, if needed, the pallet is tilted by tilting device 14, so as to be properly orientated.

In series with tilting device 14 there is provided a device for checking the upper surface, indicated with reference numeral 15, which consists of a row of tracer rollers, which check the surface of the pallet with the tables parallel to the direction of advancement of the same pallet, whereas the 90° deviation block, indicated with reference numeral 16, changes the pallet advancement direction (from running front log side to running front short side); this operation is necessary for the type of pallet in which the direction of the tables of the lower pallet surface is orthogonal to that of the upper surface.

Moreover, in series with block 16 there is arranged a device for checking the lower surface, consisting of a series of tracer rollers, which check one of the surfaces of the pallet; in output from the system, broken pallets are deviated to a second stacker, indicated with reference numeral 18, which forms a stack of them, which is then removed by the system.

Finally, the output device, indicated with reference numeral 19, is used to transport non-faulty pallets to feed them to one or more palletising lines.

However, systems of this type are very complex and bulky and require production and operating costs that it would be desirable to reduce.

SUMMARY OF THE INVENTION

Object of the present invention is thus that of providing an automated system for checking pallets, which should obviate to the above disadvantages, that is, providing an automated checking system which should allow checking the structural integrity of pallets with great skill.

In particular, the present invention allows checking the presence of broken or cracked tables, the lack of tables, the presence of broken or cracked blocks, the lack of blocks, the presence of broken or cracked traverses, the lack of traverses, the presence of broken or cracked joists, the lack of joists, the presence of bodies or nails protruding from the tables, the integrity of the tops.

Another object of the present invention is that of indicating an automated system for checking pallets, which should allow checking any type of pallet.

A further object of the present invention is that of realising an automated system for checking pallets, which besides the checking operations, should allow carrying out further pallet handling operations in any combination of fixed surfaces and pallet stacks, performing the typical functions of stackers and de-stackers and eliminating the need of using transport devices and connecting deviations.

Last but not least, another object of the present invention is that of providing an automated system for checking pallets, which is not in the least bulky, is not substantially complex to be realised, and does not require the use of complex or particularly expensive technologies, compared to the prior art, by virtue of the achieved advantages.

These and other objectives are achieved by an automated system for checking pallets, comprising at least one input (24) and at least one output (31), wherein said automated system further comprises at least one automated station (20) where, after proper programming, a series of steps for checking the structural integrity of said pallets (22), and operations for handling said pallets (22) are carried out, wherein said automated station (20) comprises at least one handler or robot (21) which performs said handling and checking operations on said pallets (22), wherein said handler (21) cyclically performs a predetermined working program comprising fixed variables.

Upon previous suitable programming, the station can carry out the check on all types of pallets. Moreover, it can carry out handling operations without using special transport devices and/or union connectors.

BRIEF DESCRIPTION OF THE DRAWINGS

Further objects and advantages of the present invention will appear more clearly from the following description and attached drawings, provided by way of an explicative and non-limiting example. In such drawings:

FIG. 5 is a schematic side elevation view of the checking device of FIG. 4, in a first operating position;

FIG. 6 is a schematic side elevation view of the checking device of FIG. 4, in a second operating position;

FIG. 7 is a schematic top view of pallets subject to some steps of check of the tables, according to the present invention;

FIG. 9 is a schematic side elevation view of the pallet subject to a check step, according to the present invention;

FIGS. 8 and 10 are, respectively, a top view and a front view of the checking device of FIG. 3 used in a first operating position into the pallet;

FIG. 11 is a front view of the checking device of FIG. 3 used in a second operating position into the pallet.

DETAILED DESCRIPTION OF THE INVENTION

Figure 1:
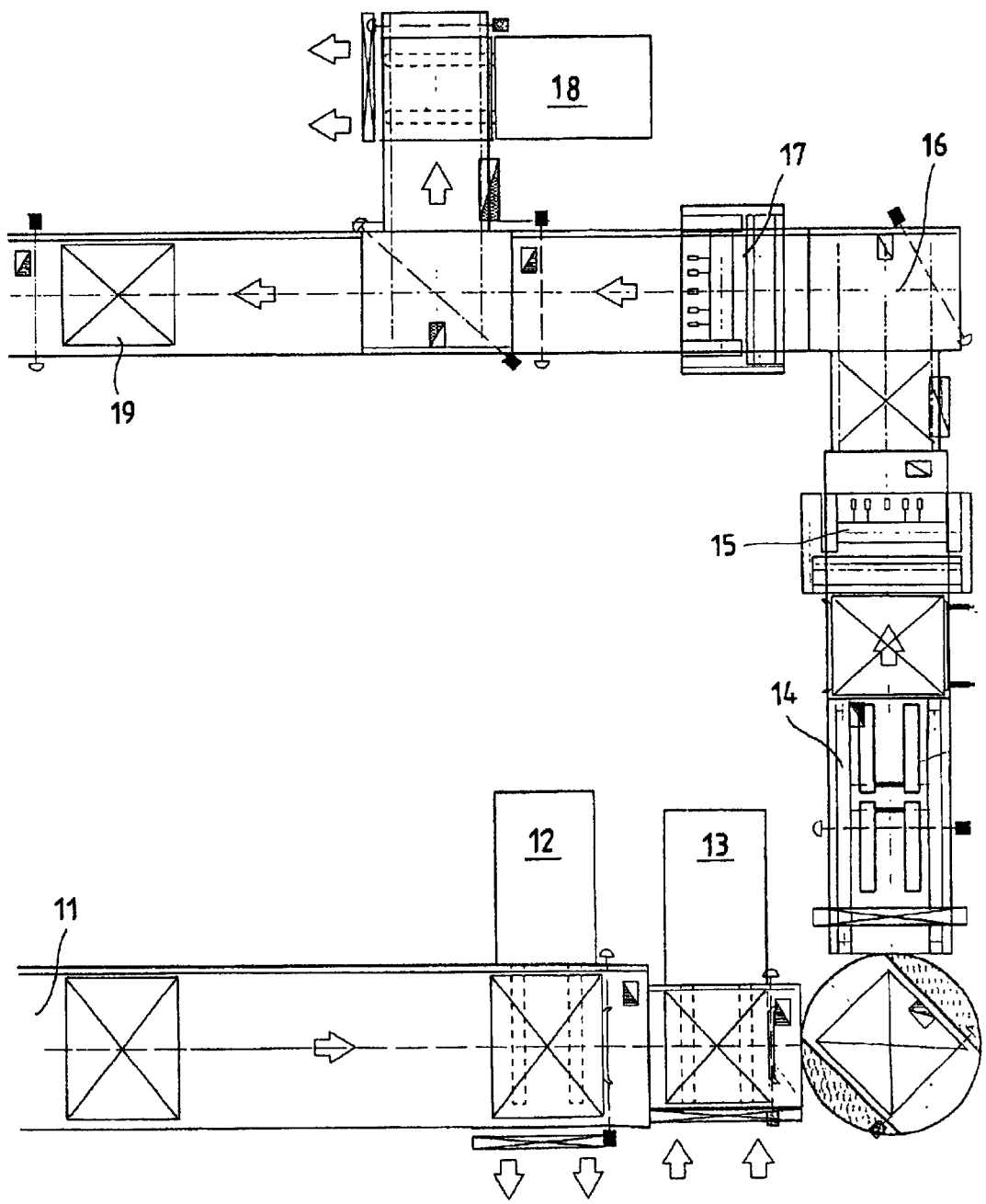
FIG. 1 is a schematic plan and partial view of a traditional pallet checking system.
Figure 2:
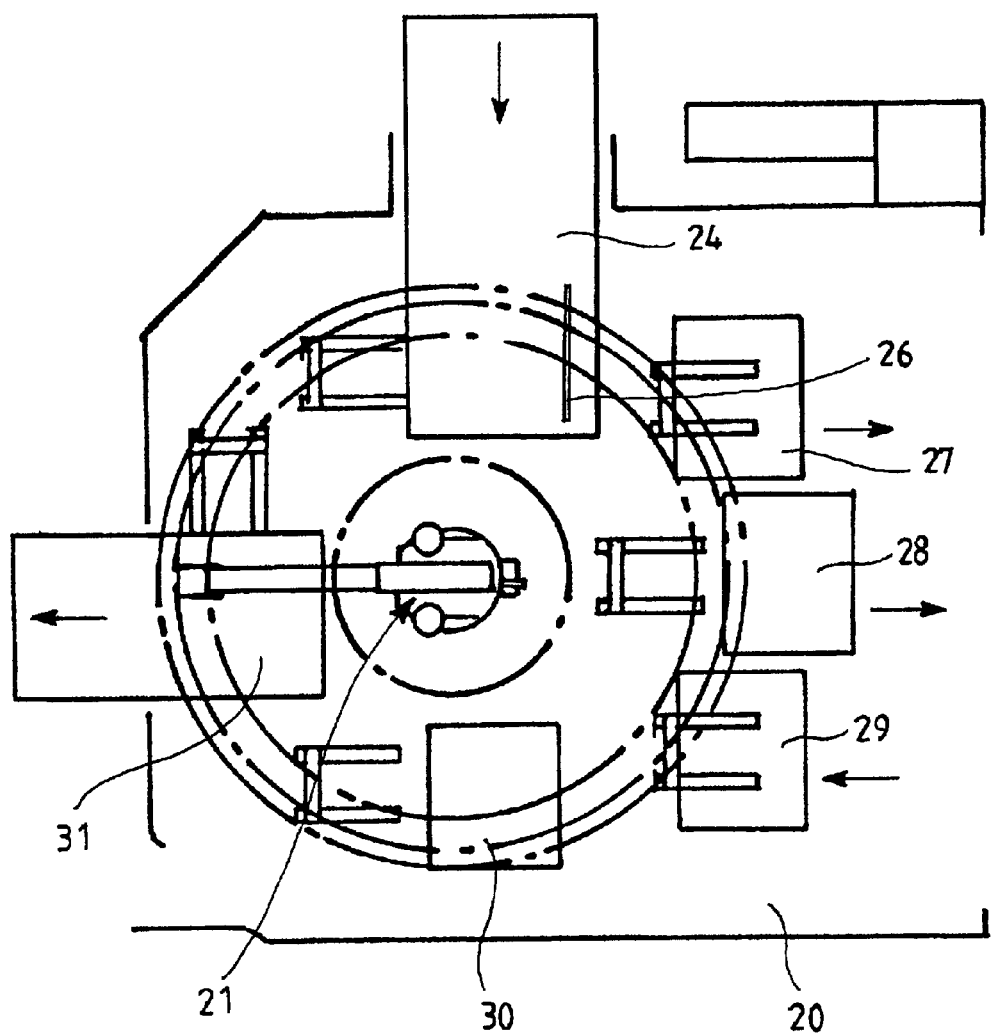
FIG. 2 is a schematic plan and partial view of an automated system for checking pallets, according to the present invention.

With particular reference to FIG. 2, which shows an automated system for checking pallets, according to the present invention, reference numeral 20 specifically indicates an automated station for checking the structural integrity of pallets.

It is based on the work cycle of a handler or robot 21, which carries out a series of operations on the pallet to be checked 22, which arrives at the checking station 20 from an input transport device 24.

The optimum check operation of each pallet 22 is carried out, according to the present invention, by carrying out a series of operations, starting from a workstation provided at the input duct 24, which can be finished by handler 21 into the predetermined area, such as work station 20, in different positions, indicated with reference numerals 26–31 in FIG. 2, arranged in seats determined by station 20.

The carrying out or not of some checking operations performed by handler 21 in station 20, as well as their sequence, depend on the type of pallet 22 subject to check, and on the machines preceding and following the robot checking station 20.

However, in exemplificative but non-limiting embodiments of the invention, the typical work cycle of robot 21 consists of a series of the following operations, carried out in a sequence: pallet locking, determination of the height of the pallet to be checked, determination of the orientation of the tables of the pallet upper surface, check of the integrity of one or both sides of the pallet, pallet unlocking, pallet tilting, collection and storage of the pallet in a place depending on the result of the inspection and check test.

Below is a more detailed description of the operations of a typical checking sequence, which is realised at the positions 26–31, arranged around handler 21 and at such distance as to allow the intervention of the same into station 20; in fact, handler 21 cyclically follows a predetermined work program based on predetermined variables.

In this case, the operation must give priority to the processing of the pallets 22 coming from the input transport 24 and, in the second place, to the feeding of the output transport 31.

To this purpose, during the normal operating cycle, if a pallet 22 is present on the input transport device 24, handler 21 checks it and, if the checking test is positive and the output transport duct 31 is free, the same handler 21 lays in onto the output transport 31.

Alternatively, the application program managing the whole operating cycle can be varied by deactivating the output transport 31, thereby preventing the same handler 21 from laying pallets 22 onto the output transport device 31.

If the input transport device 24 is engaged, handler 21 checks pallet 22 present therein even if the output transport device 31 is engaged; in this case, handler 21 lays pallet 22 onto a stack of pallets that have positively passed the checking test 27.

If the input transport device 24 is free and the output transport duct 31 is also free, handler 21 collects a pallet 22 from the stack of pallets that have positively passed the test 27 and lays it onto the output transport duct 31; alternatively, if the stack of "good" pallets, indicated with reference numeral 27 in FIG. 2, is empty, handler 21 collects a pallet 22 from the stack 29 of new pallets, checks it in position 30, and lays it onto the transport device 31 in output from the check station 20.

During the operating cycle with non-empty pallets 22, robot 21 collects pallets 22 from the input duct 24 and lays them onto the stack 27 of "good" pallets without checking them.

If after the check pallet 22 is found to be broken, robot 21 checks the stored height measurement of the stack 28 of rejected pallets and, if the above stack is not full, collects pallet 22 and lays it onto stack 28. When the stacks of good pallets 27 or of broken pallets 28 are full, robot 21 reports their statue to the operator and waits for their removal.

When the stack of new pallets 29 is empty, robot 21 reports its status to the operator and waits for the stack to be reintegrated.

In each gripping sequence of each pallet 22, through handler 21, the above handler 21 checks the status of two electronic detection devices arranged at the tips of the gripping forks; if the series of the two detected signals sets to a low logical signal, robot 21 stops, moves outside the range of pallet 22 and signals that the same pallet cannot be gripped by the forks, then waits for the removal of the same by the operator. The same operating principle is used when the forks are expanded, a movement intended to grip and handle pallets 22, if at least one of the limit switch detection devices, that are responsible for detecting the totally expanded fork position, reports a high logical level; in fact in this case, the pallet cannot be collected.

In particular, the integrity check of pallets 22 is carried out by handler 21 by checking pliers, alternatively realised as indicated in FIG. 3 or 4–6.

Figure 3:
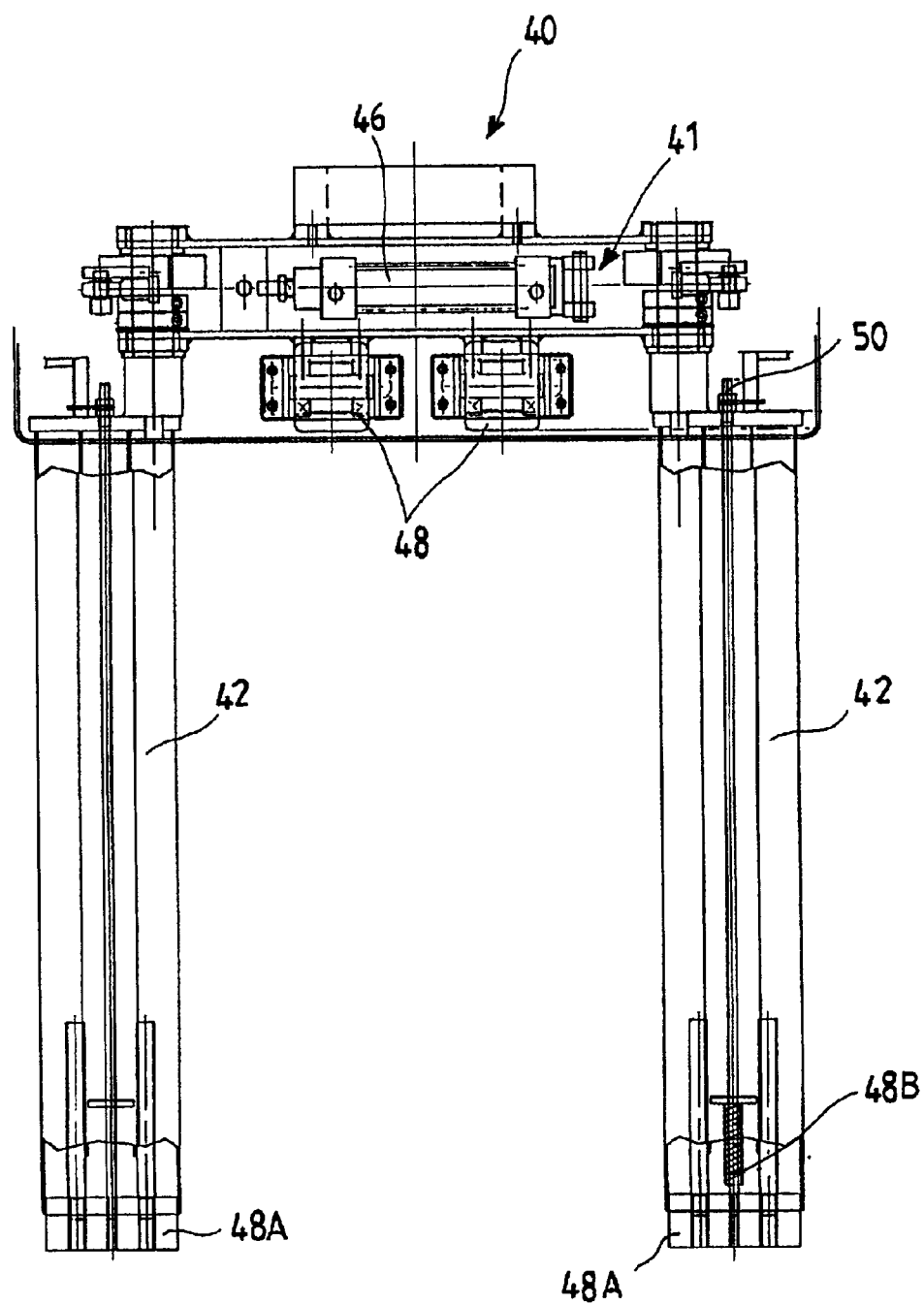
FIG. 3 is a schematic plan view of a first embodiment of a pallet checking device used in the system of FIG. 2, according to the present invention.

In a first exemplificative but non-limiting embodiment, the pliers—indicated with reference numeral 40 in FIG. 3—actually consist of a frame 41 to which two clamps or forks 42 and two tracer rollers 48 are fixed. Clamps 42 are used to handle pallets 22; they are mobile and exhibit two possible operating positions: operation at rest and operation at expansion.

In rest position, fork 42 is horizontal and, since its thickness is equal to about 20 mm, it can be easily introduced into opening 49 comprised between the upper 44 and lower 45 surfaces of pallet 22, as shown in detail in FIGS. 10 and 11.

FIGS. 10 and 11 show in detail the gripping movement of a pallet 22, after introducing forks 42 into opening 49 of pallet 22 (FIG. 10), each of said forks 42 is rotated by cylinders 46 into the same opening 49 (FIG. 11), so as to clamp pallet 22 by exerting a pressure between surfaces 44 and 45.

Each fork 42 of pliers 40 is actuated by a pneumatic cylinder 46, onto which there are arranged two limit switch detectors (not shown in the figure); a first detector signals that the rest position has been reached, whereas a second limit switch detector signals that a position of maximum rotation has been reached due to a maximum expansion of cylinder 46: such position of maximum expansion can only be reached for particular ruptures of pallet 22, that is, when surfaces 44, 45 of pallet 22, if subject to diverging pressure, move apart from one another, thus preventing a proper clamping.

At the end of each fork 42 there is arranged a re-entering mechanical tracer 48A, provided with springing, by member 48B; a shock onto tracer 48A during a horizontal movement of introduction of forks 42 into opening 49 causes the disengagement of a proximity sensor, indicated with reference numeral 50 in FIG. 3, and fixed to the opposed end of tracer 48A.

Rollers 48 are mobile in a vertical direction, and they have two possible positions, high and low, respectively corresponding to the operating positions of pliers 40, illustrated in FIGS. 10 and 9; in high position (FIG. 10), each roller 48 totally re-enters into the lower area of frame 41 of pliers 40, and thereby is in rest position.

In low position (FIG. 9), each roller 48 protrudes by about 200 mm from the lower surface of pliers 40 and is used for the surface check operations and for determining the level.

Each roller 48 is actuated by a pneumatic cylinder 48D, onto which there are arranged two electronic limit switch detector devices, schematically indicated with reference numeral 47, and provided, in particular, at the high and low positions, respectively.

At the actuation pin of one of the two rollers there is fixed a photocell (not shown) which moves integrally with roller 48; the photocell, with direct reflection and with a range of action of about 400 mm, is arranged horizontally, so that the direction of the light beam is orthogonal to the motion of rollers 48.

The photocell is provided for safety reasons, since when an operation for determining the level is performed, if one of tables 51 (the one selected for the test), of which each pallet 22 consists, is lacking, rollers 48 continue their stroke in the lower side of the upper surface 44 of pallet 22, thus engaging the photocell beam, and generating a signal that interrupts the action in progress.

In the proximity of the lower surface of frame 41 of pliers 40, between the two rollers 48, there is fixed a second photocell (not shown), which, being with direct reflection and with a range of action of about 200 mm, is vertically arranged, so that the light beam is directed downwards; such photocell is used to determine the orientation of tables 51 of the upper surface 44 of pallet 22.

Figure 4:
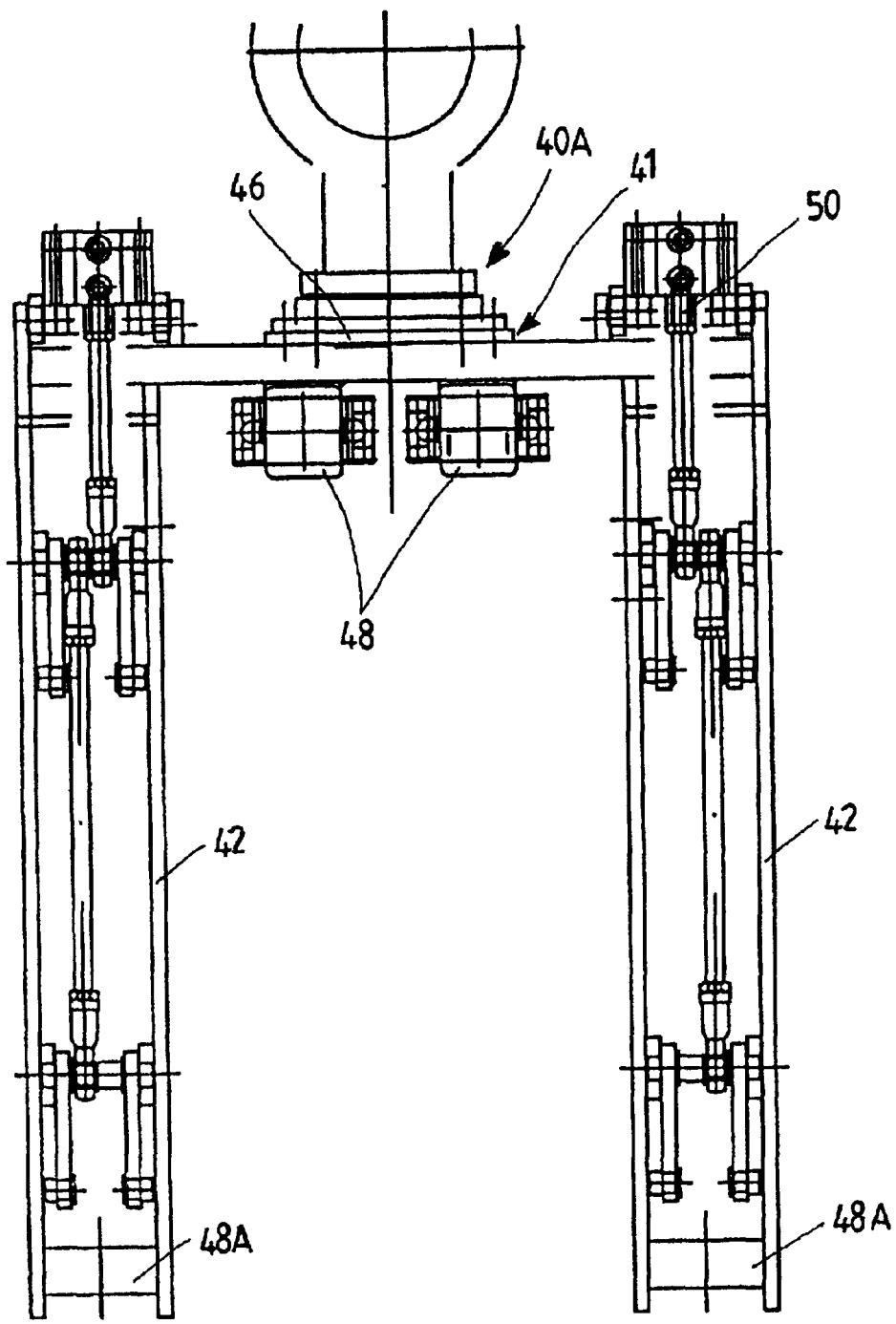
FIG. 4 is a schematic plan view of a second embodiment of a pallet checking device, used in the system of FIG. 2, according to the present invention.

As an alternative to pliers 40, it is possible to use pliers 40A, shown in detail in FIGS. 4–6, whose structural features are substantially similar to those of pliers 40; in particular, the members of pliers 40A having the same function as those of pliers 40 have been identified by the same reference numerals.

Moreover, from the attached drawings, the function of this type of pliers is clear. They allow locking pallet 22, by a translation movement of the longitudinal member 60, which in working position is actuated and forced to translate outwards thanks to the movement of brackets 61, pivoted in fixed points, indicated with reference numeral 62, of a motion actuator cylinder 63.

Forks 42 are introduced into opening 49 into pallets 22 with retracted member 60 (FIG. 5); in this case, the locking and handling of the same pallets 22 occur thanks to the pressure exerted by member 60, protruding from the frame of forks 42 in an active working position (FIG. 6), which presses against one of the surfaces 44, 45 (upper or lower) of pallet 22, inside opening 49.

The operation of the system for checking pallets, according to the present invention, is substantially as follows.

In the first place, the operations of the check sequence comprise locking pallet 22, which is thereby aligned with respect to fixed strikers by a special pneumatic pusher 26.

Handler 21 can also be used for determining the height of pallet 22 to be checked; in this case, robot 21 is arranged so that rollers 48 of pliers 40, 40A are at the vertical of each table 51 of the upper surface 44 of pallet 22; such arrangement movement is suitably realised by the electronic management apparatus of the system, based on the size, geometry and type of pallet 22.

Rollers 48 are moved to a low position (FIG. 9) and then, the pressure inside cylinder 48D, which moves them, is vented out, thus letting them slide upwards freely.

Since robot 21 starts a downward motion, at a certain point at least one of rollers 48 meets the upper surface 44 of one of tables 51 of the pallet 22 selected for the test.

While robot 21 continues its downward motion, the guides and the pin of cylinder 48D, which support roller 48, slide upwards relative to their support, thereby disengaging the low position limit switch detector 47 of roller 48.

After the status change of the signal coming from the limit switch detectors 47 of rollers 48, handler 21 interrupts its downward motion and, based on the position reached, calculates the actual height of pallet 22 or better, the level of its upper surface 44. To determine the orientation of tables 51 of the upper surface 44 of pallet 22, robot 21 arranges in such way that the vertically orientated photocell is on the vertical of the theoretical position of one of tables 51 of the upper surface 44 of pallet 22, properly selected based on the type of pallet 22, so that the light beam of the photocell is virtually engaged.

Robot 21 moves horizontally in parallel with the direction of the selected table 51 (as shown in FIG. 7), by a distance that depends on pallet 22 and that is equal to a fraction of the overall length of table 51.

If table 51 of pallet 22 subject to check is orientated in parallel to the direction of movement, as shown in FIG. 7, the photocell light beam remains engaged for the entire duration of the movement.

If, on the contrary, tables 51 of the upper surface 44 of pallet 22 are orientated orthogonal to the direction of movement (as shown in FIG. 8), during movement the photocell light beam is disengaged due to the spacing 53 present between tables 51.

Based on the occurrence or not of the disengagement of the photocell light beam, robot 21 can determine the orientation of the checked table 51; the check test is normally repeated a second time and, in the event of inconsistent results, it is repeated a third time for confirmation.

For the operation for checking the integrity of one side of pallet 22, rollers 48 of pliers 40, 40A are brought to a low position and the pressure inside cylinder 48D, which moves them, is maintained (FIG. 9).

Robot 21 arranges so that rollers 48 are on the vertical of the theoretical position of the outside edge of one or two tables 51 of the upper surface 44 of pallet 22 to be checked, orientating pliers 40, 40A, so that the direction of rolling of rollers 48 is parallel to tables 51.

Then, robot 21 moves downwards laying rollers 48 onto tables 51, and compressing cylinders 48D that actuate them, so as to disengage the low position limit switch detectors 47 (position shown in detail in FIG. 9).

Robot 21 moves in horizontal direction in parallel to the direction of the selected tables 51 so that the opposite end of said tables 51 is reached; if in any point the integrity of a table 51 subject to the check, of a traverse, of a block, or of an underlying joist lacks, during the downward movement of pliers 40, 40A, such table 51 does not resist to the pressure exerted by roller 48 (adjustable based on the type of pallet 22) which, in the meantime, has moved downwards to low position, thus engaging the low position limit switch detector 47 again.

The presence of bodies or nails protruding from table 51 causes the re-engagement of the high position limit switch detector 47.

Based on the occurrence or not of the re-engagement of the limit switch detector 47, robot 21 determines the integrity or not of table 51; the check cycle is repeated for all tables 51 of pallet 22.

Moreover, the system according to the invention allows programming, at a level of peripheral management, the definition of critical tables of pallet 22, whose non-integrity must imply the immediate classification of pallet 22 as "broken", and thereby, to be rejected, and of non-critical tables, for which it is possible to set a maximum allowable number of non-integral tables for each side, exceeded which pallet 22 is regarded as to be rejected.

For the tilting operation of pallet 22, robot 21 grips pallet 22 by the upturned pliers 40, 40A, actuating the mechanical tracers 48A at the ends of forks 42 to determine the shocks caused by anomalous bulky elements present into opening 49, between the two surfaces 44, 45 of pallet 22. Afterwards, robot 21 lifts pallet 22 from a centring zone, turns it onto a side and lays it upturned at a certain distance from the fixed strikers used for locking.

At the end of the check operations, robot 21 collects pallet 22 and lays it at a destination established according to the test result.

The destination can be a fixed plane, such as the surface of a motorised roller transport device 31, in output from station 20, or a variable height item, such as a pile of pallets 27; in the latter case, before laying pallet 22, the level of the laying surface is determined using the tracer devices 48A, in a way similar to the check step at the height of pallet 22.

Finally, the automated check and inspection station 20, in the described configuration, besides the checking operations, can carry out any other operation for handling pallets 22 between any combination of fixed surfaces and piles of pallets 27, carrying out the typical functions of the stackers and de-stackers present in traditional checking systems and eliminating the need of providing special transport ducts and bulky and complex union deviations.

With particular reference to the system of FIG. 2, which shows an exemplificative but non-limiting embodiment of an automated checking system, according to the present invention, it is possible to note, in particular, a first motorised roller input transport device 24, a first tank 27, where the checked pallets coming from position 26 are stacked, a second tank 28 where the pallets to be rejected are stacked, a third tank 29, where the "new" pallets of the client are loaded, a fourth tank 30, where the pallets coming from position 29 are checked, and a second motorised roller output transport device 31, which receives pallets from positions 26, 27, 30.

The system exhibits two different operating modes: in a first case, on input 24 and on output 31 there are pallets 22 of the same type, and tank 29 is used as storage unit to compensate for the rejected pallets coming from the input transport 24 without interrupting the feeding of the output transport 31; alternatively, the input transport 24 and the output transport 31 operate with pallets of different types, and in this case, pallet 22 coming from the input transport 24 is stacked into tank 27 without being checked, whereas pallets 22 coming from tank 29 are used to feed the output transport 31.

In particular, the operating cycle carried out by pliers 40, 40A for gripping and checking pallets 22 provides for the following steps.

Pallet 22 arrives onto the transport device 24 up against the fixed stop and at this point, a pneumatic side 26 intervenes, which sides pallet 22 with a striker parallel to the input direction, thus locking it; then, pliers 40, 40A moves to the position for checking the height of pallets 22, the two tracer rollers 48 move downwards to engage the limit switches 47 of descent of the tracer rollers 48 and then, robot 21 lowers onto pallet 22 up to free the limit switch detectors 47 of descent of the tracer rollers 48.

Pliers 40, 40A then perform two or three horizontal movements by about 400 mm, parallel or in orthogonal directions, to recognise the direction of tables 51, and then trace table 51 with horizontal movements by a length equal to the length of tables 51; if at least one of the two limit switch detectors 47 of descent of the tracer cylinder 48D signals a high logical level, pallet 22 is rejected and thus stacked into tank 28.

Otherwise, robot 21 pilots the movement of forks 42 into opening 49 of pallet 22, so as to make it rotate by 180°, and repeats the check of the lower tables, moving in parallel with the direction of tables 51.

If after these checks pallet 22 is "good" and transport 31 is free, handler 21 arranges the pallet thereon; if, on the contrary, transport 31 is engaged, robot 21 arranges the "good" pallet into tank 27.

The steps for laying pallet 22 into the stacks of positions 27 or 28 occur by the two tracer rollers 48, which move downwards.

Robot 21 arranges so that the tracer rollers 48 are forward by about 100 mm on the stack and from top; pliers 40, 40A then move downwards up to free the descent limit switch detectors 47, so as to store the exact position of the top of the pallet stack, then retracts by a distance of 100 mm and lays pallet 22.

In this way, it is possible to always know the exact level of the stack and of course, after each stop, the laying always occurs from the maximum height, with slow descent.

The previously described check and inspection steps are carried out by the system, according to the present invention, also starting from tank 29, wherein the stack of pallets 22 is normally arranged by the client. In this case, pliers 40, 40A collect one pallet 22 at a time and lay it at tank 30; the centring cylinder moves pallet 22 against the corner of tank 30 and holds it still during the reading of the measurements.

Then, pliers 40, 40A move to the position for checking the height of pallet 22 and the two tracer rollers 48 move downwards, thereby engaging the descent limit switches 47 and robot 21 moves downward onto pallet 22, so as to free the limit switch detectors 47 of descent of rollers 48.

Afterwards, pliers 40 perform horizontal movements in parallel or orthogonal directions to recognise the direction of tables 51, and thus, the checks of tables 51 are carried out on both the upper 44 and lower 45 surfaces of pallet 22. If pallet 22 is found to be "good", and transport 31 is free, robot 21 arranges it onto 31, otherwise waits; if pallet 22 is to be rejected, it arranges the latter into tank 28, where the step of laying pallet 22 occurs as described above. The features of the automated pallet checking system object of the present invention, as well as its advantages, are clear from the above description.

Finally, it is clear that several variants can be made to the automated checking system, according to the present invention, without departing from the novelty principles of the inventive idea, and it is also clear that, in the practical embodiment of the invention, materials, shapes and sizes of the illustrated details can be of any type according to the requirements, and the same can be replaced with others, technically equivalent.

What is claimed is:

1. Automated system for checking pallets (22), wherein said automated system comprises at least one automated station (20) including at least one input transport device (24) and at least one output transport device (31), wherein said at least one automated station (20) where, after proper programming, performs a series of steps for checking the structural integrity of said pallets (22) and operations for handling said pallets (22) are carried out by a single handler or robot (21) which performs all of said handling and checking operations on said pallets (22) at a single workstation, wherein said handler (21) or robot cyclically performs said operations in a sequence which provides for at least the following steps: pallet (22) locking, determination of the height of said pallets (22) to be checked, determination of the orientation of tables (51) of at least one surface (44) of said pallets (22), checking of the integrity of said tables (51) of each side of said pallets (22), pallet (22) unlocking, pallet (22) tilting, collection and storage of said pallets (22) in a place depending on a result of said handling and checking operations.

* * * * *